United States Patent [19]

Kirchmeyer et al.

[11] Patent Number: 5,547,711
[45] Date of Patent: Aug. 20, 1996

[54] SELF-CROSSLINKING PREPARATIONS, PRODUCTION AND USE THEREOF

[75] Inventors: Stephan Kirchmeyer, Leverkusen; Klaus Pohmer; Tillmann Hassel, both of Köln, all of Germany

[73] Assignee: Bayer Aktiengesellschaft, Leverkusen, Germany

[21] Appl. No.: 444,604

[22] Filed: May 19, 1995

[30] Foreign Application Priority Data

May 26, 1994 [DE] Germany .................. 44 18 308.9

[51] Int. Cl.$^6$ .................. B05D 3/02; C08K 3/20; C08G 77/24
[52] U.S. Cl. .................. 427/386; 427/387; 106/287.13; 528/42; 523/404; 523/414; 523/417; 523/421; 523/425; 523/435; 524/837; 524/838; 524/588; 8/94.18; 8/115.6; 8/115.64
[58] Field of Search .................. 524/838, 837, 524/588; 528/42; 427/387, 386; 106/287.13; 523/404, 414, 417, 421, 425, 435; 8/94.18, 115.6, 115.64

[56] References Cited

U.S. PATENT DOCUMENTS

| | | | |
|---|---|---|---|
| 2,884,433 | 4/1959 | Smith | 260/448.2 |
| 3,297,519 | 1/1967 | Rambosek | 162/164 |
| 3,828,087 | 8/1974 | Pittman et al. | 528/42 |
| 3,847,961 | 11/1974 | Koshar | 528/42 |
| 4,299,975 | 11/1981 | Asbeck et al. | 524/723 |
| 4,460,740 | 7/1984 | Arai | 524/724 |
| 4,533,713 | 8/1985 | Howells | 528/26 |
| 4,582,874 | 4/1986 | Grape et al. | 524/588 |
| 4,927,950 | 5/1990 | Hisamoto et al. | 556/419 |
| 4,940,743 | 7/1990 | Grape et al. | 524/377 |
| 4,983,459 | 1/1991 | Franz et al. | 428/410 |
| 5,017,718 | 5/1991 | Ojima et al. | 556/466 |
| 5,039,739 | 8/1991 | Padget et al. | 524/839 |
| 5,180,845 | 1/1993 | Higley | 556/445 |
| 5,247,008 | 9/1993 | Michels et al. | 524/544 |
| 5,290,900 | 3/1994 | Kobayashi | 528/26 |
| 5,324,763 | 6/1994 | Rössler et al. | 524/368 |
| 5,346,949 | 9/1994 | Fukazawa | 524/805 |
| 5,357,025 | 10/1994 | Altes et al. | 528/42 |
| 5,372,731 | 12/1994 | Michels et al. | 252/8.8 |

FOREIGN PATENT DOCUMENTS

| | | |
|---|---|---|
| 0125826 | 11/1984 | European Pat. Off. . |
| 0640611 | 3/1995 | European Pat. Off. . |
| 2218097 | 11/1989 | United Kingdom . |

OTHER PUBLICATIONS

E. Müller in Houben–Weyl Methoden der Organisher Chemie, vol. 1412, pp. 1 – 5, 21 – 23, and 40 – 44, Stuttgart.
C. R. Martens, Alkyd Resins, Reinhold Plastics Applications Series, pp. 51 – 59, (1961).
Derwent Database, Abstract No. An 35–059894, Abstract of JP 60–17 197 (1985).

*Primary Examiner*—Margaret W. Glass
*Attorney, Agent, or Firm*—Sprung Horn Kramer & Woods

[57] ABSTRACT

Self-crosslinking preparation made from water, alkoxysiline compounds containing perfluoroalkyl groups, compounds soluble in water or emulsifiable or dispersible in water containing perfluoroalkyl groups and optionally further constituents, which preparations are storage stable and suited for the protection of glass, stony material, textiles, leather and paper.

9 Claims, No Drawings

SELF-CROSSLINKING PREPARATIONS, PRODUCTION AND USE THEREOF

The present invention relates to self-crosslinking preparations made from water, alkoxysilane compounds containing perfluoroalkyl groups, compounds soluble in water or emulsifiable or dispersible in water containing perfluoroalkyl groups and optionally further constituents, to the production and to the use thereof.

Due to their surface tension, compounds with perfluoroalkyl groups exhibit marked effects in relation to water and dirt repellency. Solvent-free aqueous solutions, dispersions or emulsions are a preferred application form for compounds, polymers or resins bearing perfluoroalkyl groups. The production of aqueous polyurethane polymers having perfluoroalkyl groups or perfluoropolyethers by reacting hydroxy-functional perfluoroalkyl units, isocyanates and ionic or non-ionic units and the synthesis of acrylate-based polymers having perfluoroalkyl groups, which polymers are either produced as aqueous dispersions or may readily be converted into aqueous dispersions, is known from a whole range of documents (see, for example, EP-A 491 248, EP-A 533 159, EP-A 552 630 and EP-A 572 269, EP-A 560 161, U.S. Pat. No. 5,039,739).

Perfluoroalkylalkoxysilanes are claimed, for example, in U.S. Pat. No. 2,884,433, EP-A 115 943, DE-A 3 913 485 and WO 93/20084. Perfluoroalkylalkoxysilanes may be used as agents for treating, protecting and impregnating stony materials, textiles and paper. The advantage of these compounds is that they may be applied to the substrate as monomers, so exhibiting ideal properties for effective impregnation and elevated efficacy even in a thin layer. These monomeric compounds simultaneously crosslink with each other and with the substrate, such that polymeric networks are obtained after application which are no longer soluble and thus have elevated long-term effectiveness (U.S. Pat. No. 4,983,459).

These alkoxysilanes must, however, be applied from formulations containing solvents, as they are not compatible with water nor may they be converted into stable aqueous emulsions or dispersions using customary emulsifiers and dispersants. Moreover, in an aqueous medium alkoxysilanes hydrolyze to the corresponding silanols, which condense to yield polysiloxanes and finally networks. Aqueous solutions of customary alkoxysilanes are thus stable for only a few days. Aqueous dispersions or emulsions of alkoxysilanes bearing perfluoroalkyl groups are not known. An aqueous application form would, however, be highly advantageous and very desirable for industrial use. In particular, preparations which have an elevated fluorine content, which may be applied from an aqueous medium and which moreover crosslink with themselves and with the substrates to be protected, are industrially advantageous.

The object of the invention is thus to provide preparations which contain perfluoroalkylalkoxysilanes and which are soluble, emulsifiable or dispersible in water.

It has now surprisingly been found that certain compounds prepared from sulphonamides having perfluoroalkyl groups, hydrophilic polyethers and industrially used epoxy resins are excellently suited as emulsifiers or dispersants for alkoxysilanes bearing perfluoroalkyl groups. The emulsions produced in this manner exhibit elevated and unpredictable stability, which amounts to several months, crosslink after elimination of water to yield a polymeric network, are thus no longer soluble and exhibit elevated long-term effectiveness.

The present invention provides self-crosslinking preparations containing the following constituents:

a) water b) alkoxysilane compounds of the general formula (I) containing perfluoroalkyl groups

wherein $R^f$ means a monovalent perfluoroalkyl group with 4 to 20 carbon atoms, A means an (a+1)-valent aliphatic, cycloaliphatic, aromatic or heterocyclic group or a radical containing several of these groups, each with 1 to 20 carbon atoms, which radical may optionally contain 1 to 10 oxygen, nitrogen or sulphur atoms, b means 1 or 0, a means a number from 1 to 4 if b=1, and 1 if b=0, X, Y and Z mean identical or different monovalent alkoxy groups with 1 to 6 carbon atoms optionally interrupted by one to two oxygen atoms, cycloalkoxy groups with 6 to 10 carbon atoms, aryloxy groups with 6 to 10 carbon atoms, alkyl groups with 1 to 6 carbon atoms, cycloalkyl groups with 6 to 10 carbon atoms or optionally substituted aryl groups with 6 to 10 carbon atoms, providing that at least one of X, Y and Z denotes an alkoxy group, c) compounds soluble in water or emulsifiable or dispersible in water containing perfluoroalkyl groups, which compounds may be produced from c1) one or more sulphonamides of the general formula (II) having perfluoroalkyl groups

wherein $R^{f1}$ has the same meaning as $R^f$ in formula (I), but independently thereof, and $R^1$ means hydrogen or a monovalent hydrocarbon chain with 1 to 20 carbon atoms, optionally interrupted by 1 to 4 oxygen atoms, c2) at least one compound having groups reactive with 1,2-epoxide groups and having oxyethylene units, c3) at least one compound with 1,2-epoxide groups and c4) optionally further compounds with groups reactive with 1,2-epoxide groups, providing that the compounds c) contain 5 to 95 wt. % of oxyethylene units, d) optionally further constituents.

The present invention also provides a process for the production of the self-crosslinking preparations according to the invention, which process is characterized in that at least one alkoxysilane compound of the general formula (I) containing perfluoroalkyl groups, at least one compound containing perfluoroalkyl groups which is soluble in water or emulsifiable or dispersible in water and may be produced from one or more sulphonamides of the general formula (II) having perfluoroalkyl groups, at least one compound having groups reactive with 1,2-epoxide groups and having oxyethylene units, at least one compound containing 1,2-epoxide groups and optionally further compounds with groups reactive with 1,2-epoxide groups, optionally together with further constituents, are together dissolved, emulsified or dispersed in water.

Particularly preferably, the alkoxysilane compounds containing perfluoroalkyl groups of constituent b), the compounds of constituent c) containing perfluoroalkyl groups and soluble in water or emulsifiable or dispersible in water and the compounds bearing perfluoroalkyl groups prepared from one or more sulphonamides of the general formula (II) having perfluoroalkyl groups optionally contained in constituent d), at least one compound with 1,2-epoxide groups and optionally further compounds with groups reactive with 1,2-epoxide groups are produced together and together dissolved, dispersed or emulsified in water.

The self-crosslinking preparations are preferably used as agents to treat, protect and impregnate stony materials, textiles, leather and paper.

The self-crosslinking preparations according to the invention preferably contain water in a quantity of 95 to 5 wt. %, particularly preferably in a quantity of 50 to 10 wt. % related to the total quantity of the self-crosslinking preparation. The function of the water is to act as the application medium and to adjust viscosity to the application. Apart from this function, the water in most cases hydrolyzes at least some of the alkoxysilane groups contained in the preparations according to the invention to silanol groups. However, it is practical in many cases further to reduce the concentration of the preparations according to the invention before application, for example, to between 0.5 and 0.05 wt. % to reduce the quantity of fluorine applied or to adjust the viscosity of the aqueous application form to the requirements of the particular application. It is, moreover, possible to produce, store or transport the preparations according to the invention without adding water and to dilute them to the concentration suitable for the particular application just before application. The dilution operation then also includes the hydrolysis of the alkoxysilane groups which occurs in most cases. This method is in particular advantageous because it is possible to dispense with the storage and transport of water. The preparations preferably already contain water as, in many cases, the first addition of water requires the presence of certain apparatus or laboratory equipment, whereas dilution of the preparations already containing water may be performed simply and without elaborate equipment.

The alkoxysilane compounds containing perfluoroalkyl groups contained as component b) in the preparations according to the invention are of the general formula (I)

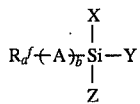
(I)

wherein $R^f$ means a monovalent perfluoroalkyl group with 4 to 20 carbon atoms, A means an (a+1)-valent aliphatic, cycloaliphatic, aromatic or heterocyclic group or a radical containing several of these groups, with 1 to 20 carbon atoms, which groups may optionally contain 1 to 10 oxygen, nitrogen or sulphur atoms, b means 1 or 0, a means a number from 1 to 4 if b=1, and 1 if b=0, X, Y and Z mean identical or different monovalent alkoxy groups with 1 to 6 carbon atoms optionally interrupted by one to two oxygen atoms, cycloalkoxy groups with 6 to 10 carbon atoms, aryloxy groups with 6 to 10 carbon atoms, alkyl groups with 1 to 6 carbon atoms, cycloalkyl groups with 6 to 10 carbon atoms or optionally substituted aryl groups with 6 to 10 carbon atoms, providing that at least one of X, Y and Z denotes an alkoxy group.

The residue $R^f$ is a monovalent perfluoroalkyl group with 4 to 20 carbon atoms, for example straight-chain or branched perfluorobutane, perfluoropentane, perfluorohexane, perfluoroheptane, perfluorooctane, perfluorononane, perfluorodecane or perfluorododecane groups, preferably perfluorobutane and perfluorooctane groups. The organic groups X, Y and Z may be identical or different. X, Y and Z are preferably monovalent alkoxy groups with 1 to 6 carbon atoms optionally interrupted by one or two oxygen atoms, such as for example methoxy, ethoxy, propoxy, butoxy or methoxyethoxy groups, cycloalkoxy groups with 6 to 10 carbon atoms, such as for example cyclohexyloxy groups, aryloxy groups with 6 to 10 carbon atoms, such as for example phenoxy groups, alkyl groups with 1 to 6 carbon atoms, such as for example methyl, ethyl, propyl or butyl groups, cycloalkyl groups with 6 to 10 carbon atoms, such as for example cyclopentyl, cyclohexyl or methylcyclohexyl groups, or optionally substituted aryl groups with 6 to 10 carbon atoms, such as for example phenyl or tolyl groups. It is important that at least one of the residues X, Y and Z is an alkoxy group.

The perfluoroalkylalkoxysilanes are preferably compounds of the general formula (III)

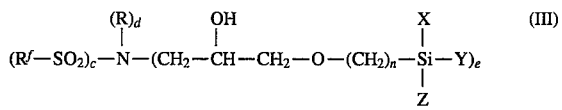
(III)

wherein, $R^f$, X, Y and Z have the same meaning as in formula (I),

R means hydrogen or a monovalent hydrocarbon chain with 1 to 20 carbon atoms, optionally interrupted by 1 to 4 oxygen atoms, preferably a monovalent aliphatic group with 1 to 4 carbon atoms, c means 1 or 2, preferably 1, d means 0 or 1, preferably 1, e means 3–a–b, but at least 1, preferably 1, and n means an integer from 2 to 4, preferably 3.

The group R is a monovalent group, preferably a monovalent aliphatic group with 1 to 4 carbon atoms, for example methyl, ethyl, propyl, butyl or 1-methylethyl groups, particularly preferably methyl or ethyl groups.

Preferred perfluoroalkylsulphonamidoalkoxysilanes may, for example, be produced by reacting 1 tool of a compound of the general formula (II) with 2 tools, if R=H, otherwise 1 tool of a compound of the general formula (V)

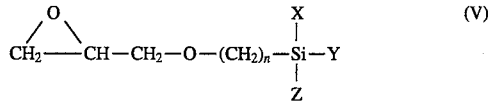
(V)

wherein X, Y, Z and n have the stated meanings, at temperatures of −20° to 200° C., preferably between 60° and 150° C., particularly preferably between 80° and 120° C.

Suitable perfluoroalkylalkoxysilanes are, for example, perfluorohexylsulphonyl-N-ethyl-N-triethoxysilyl-propylamide, perfluorooctylsulphonyl-N-trimethoxysilylpropylamide, perfluorooctylsulphonyl-N-triethoxysilyl-propylamide, perfluorooctyl-sulphonyl-N-methyl-N-trimethoxysilylpropylamide, perfluorooctylsulphonyl-N-methyl-N-triethoxysilylpropylamide, perfluorooctylsulphonyl-N-ethyl-N-trimethoxysilylpropylamide, perfluorooctylsulphonyl-N-ethyl-N-triethoxysilylpropylamide, perfluorooctylsulphonyl-N-propyl-N-trimethoxysilylpropylamide, perfluorooctyl-sulphonyl-N-propyl-N-triethoxysilylpropylamide, (4-perfluorohexylphenyl)methyldimethoxysilane, (4-perfluorohexylphenyl)methyldiethoxysilane, (4-perfluoro-octylphenyl)trimethoxysilane, perfluoroheptylphenyl-trimethoxysilane and perfluoroheptylphenyltriethoxysilane. Preferred perfluoroalkylalkoxy compounds are, for example, 3-(N-methyl-N-perfluorooctylsulphonamido)-2-hydroxypropoxy-propyltrimethoxysilane, 3-(N-ethyl-N-perfluorooctyl-sulphonamido)-2-hydroxypropoxypropyltrimethoxysilane, 3-(N-propyl-N-perfluorooctylsulphonamido)-2-hydroxypropoxypropyltrimethoxysilane, 3-(N-butyl-N-perfluorooctylsulphon-amido)-2-hydroxypropoxypropyltrimethoxysilane, 3-(N-methyl-N-perfluorooctylsulphon-amido)-2-hydroxypropoxypropyltris-(methoxyethoxy)silane, 3-(N-ethyl-N-perfluorooctylsulphon-amido)-2-hydroxypropoxypropyltris(methoxyethoxy)silane, 3-(N-propyl-N-perfluorooctylsulphonamido)-2-hydroxypropoxypropyltris(methoxyethoxy)silane, 3-(N-butyl-N-perfluorooctylsulphonamido)-2-hydroxypropoxypropyltris(methoxyethoxy)silane, 3-(N-methyl-N-perfluorobutylsulphonamido)-2hydroxypropoxypropyltrimethoxysilane, 3-(N-ethyl-N-perfluorobutylsulphonamido)-2-hydroxypropoxypropyl-trimethoxysilane, 3-(N-methyl-N-perfluorobutylsulphonamido)-2-hydroxypropoxypropyltriethoxysilane, 3-(N-ethyl-N-perfluorobutylsulphonamido)-2-hydroxypropoxypropyl-triethoxysilane, 3-(N-methyl-N-perfluorobutylsulphonamido)-2-hydroxypropoxypropyltris(methoxyethoxy)silane, 3-(N-ethyl-N-perfluorobutylsulphonamido)-2-hydroxypropoxypropyl-tris(methoxyethoxy)silane, 3-(N-propyl-N-perfluorobutyl-sulphonamido)-2-hydroxypropoxypropyltrimethoxysilane, 3-(N-butyl-N-perfluorobutylsulphonamido)-2-hydroxypropoxy-propyltrimethoxysilane or mixtures thereof or mixtures of isomeric compounds. Particularly preferred compounds are those prepared from N-alkylperfluoroalkylsulphonamide isomers, as are produced industrially by electrofluorination of alkylsulphonic acids and subsequent reaction with alkylamines, and glycidylalkoxysilanes.

The compounds of constituent c) containing perfluoroalkyl groups and soluble in water or emulsifiable or dispersible in water may be produced from one or more sulphonamides of the general formula (II) having perfluoroalkyl groups, a component which contains oxyethylene groups and has groups reactive with 1,2-epoxides, a component which contains 1,2-epoxide groups and optionally further components which have groups reactive with 1,2-epoxides. The quantity of oxyethylene groups present in the compound is 5 to 95 wt. %.

Compounds c2) of constituent c) of the self-crosslinking preparation according to the invention are mono-, di- and/or polyfunctional compounds which contain oxyethylene units (—$CH_2$—$CH_2$—O—), calculated at an oxyethylene unit equivalent weight of 44 g/mol, and have groups reactive with 1,2-epoxides. Such groups are, for example, carboxylic acid or amino and, less preferably, thiol or hydroxyl groups. In particular, hydroxyl functional groups react with 1,2-epoxide only under severe conditions, i.e. with catalysis with strong bases and/or elevated temperatures. It is preferred to convert hydroxyl functional groups into carboxyl functional groups, which is readily possible by reacting the hydroxyl functional groups with dicarboxylic acids or reactive derivatives thereof, such as for example esters or anhydrides. In this manner, carboxy-functional compounds are obtained which readily react with 1,2-epoxide groups.

The hydroxy-functional compounds used are, for example, polyethers of the per se known type having at least one, preferably two to three hydroxyl groups. These are produced by polymerization of epoxides such as ethylene oxide and additionally propylene oxide, butylene oxide or further 1,2-epoxides, for example in the presence of Lewis catalysts such as $BF_3$, or by addition of these epoxides, preferably of ethylene oxide and propylene oxide, optionally mixed or consecutively, onto starter components with reactive hydrogen atoms, such as butanol, ethoxybutanol, water, alcohols, ammonia or amines, for example ethylene glycol, 1,3- or 1,2-propylene glycol, glycerol, sorbitol, 4,4'-dihydroxydiphenylpropane, aniline, ethanolamine or ethylenediamine.

In order to convert the hydroxyl functional groups into carboxylic acid functional groups, for example by esterification, the described polyethers are reacted in a per se known manner (c.f. for example Houben-Weyl Methoden der Organischen Chemie, Stuttgart, volume 14/2, pp. 1–5, 21–23, 40–44; C. Martens, Alkyd Resins, Reinhold Publ. Comp. 1961, Reinhold Plastics Appl. Ser., pp. 51–59) with dicarboxylic acids or esterifiable derivatives thereof, optionally mixed with further mono-, di- or polyalcohols, optionally together with monocarboxylic acids in such a manner that an excess of non-esterified acid groups remains. Esterification is preferably performed to acid values of 5 to 200, particularly preferably of 30 to 100 mg KOH/g. The compounds are thus preferably polyesters containing acid groups and having oxyethylene units. Examples of further alcohols which may optionally be added during esterification are ethylene glycol, 1,2- and 1,3-propylene glycol, 1,4- and 2,3-butylene glycol, 1,6-hexanediol, 1,8-octanediol, neopentyl glycol, 1,4-bis(hydroxymethyl)cyclohexane, 2-methyl-1,3-propanediol, glycerol, trimethylolpropane, diethylene glycol, triethylene glycol, tetraethylene glycol and higher polyethylene glycols, dipropylene glycol and higher polypropylene glycols, together with dibutylene glycol and higher polybutylene glycols. Examples of dicarboxylic acids and the derivatives thereof which may be cited are: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimerized and trimerized unsaturated fatty acids, optionally mixed with monomeric unsaturated fatty acids, dimethyl terephthalate and bisglycol terephthalate.

Compounds containing oxyethylene groups functionalized by vinyl polymerization, for example compounds of the above-stated type containing oxyethylene groups grafted with acrylic acid, methacrylic acid, maleic acid, fumaric acid or itaconic acid are also suitable as component c2). Derivatives suitable for grafting are also those which may subsequently be converted into the carboxylic acids, such as for example acrylic acid esters, methacrylic acid esters or maleic anhydride.

It is also possible to use amino-terminated polyethers containing oxyethylene groups, for example those obtainable by reductive amination of the polyethers containing oxyethylene groups described above.

It is important that the compounds of component c2) have a functionality which may react with 1,2-epoxides and that the oxyethylene units are present in a quantity such that the compounds c) have a content of oxyethylene units of 5 to 95 wt. %, preferably of 20 to 80 wt. % of oxyethylene units.

The parent compounds for the compounds c3) having 1,2-epoxide groups have 1 to 45 C atoms and comprise epoxidizable di- or polyphenols, di- or polycarboxylic acids, di- or polycarboxylic anhydrides, di- or polyalcohols or at least diunsaturated compounds.

These are, for example, diglycidyl ethers of dihydric phenols such as pyrocatechol, resorcinol, hydroquinone, 4,4'-dihyroxydiphenyldimethylmethane, 4,4'-dihydroxy-3,3'-dimethyldiphenylpropane and 4,4'-dihydroxydiphenylsulphone, glycidyl esters of dibasic aromatic, aliphatic and cycloaliphatic carboxylic acids, such as for example phthalic anhydride, bisglycidyl ether or adipic acid bisglycidyl ether or glycidyl ethers of dihydric aliphatic alcohols such as butanediol bisglycidyl ether, hexanediol bisglycidyl ether or polyoxyalkylene glycol bisglycidyl ethers.

Examples of compounds with more than two epoxide groups are: polyglycidyl ethers of polyhydric phenols, for example of novolacs (reaction products of mono- or polyhydric phenols with aldehydes, in particular formaldehyde, in the presence of acid catalysts), tris-(4-hydroxyphenyl)methane or 1,1,2,2-tetra(4-hydroxyphenyl)ethane; epoxide compounds based on aromatic amines and epichlorohydrin, for example tetraglycidylmethylenedianiline, N-diepoxypropyl-4-aminophenylglycidyl ether; glycidyl esters of polybasic aromatic, aliphatic and cycloaliphatic carboxylic acids; glycidyl ethers of polyhydric alcohols, for example of glycerol, trimethylolpropane and pentaerythritol and further glycidyl compounds such as trisglycidyl isocyanurate.

Glycidyl ethers of dihydric or polyhydric phenols are preferred. The bisglycidyl ethers of 2,2(4,4'-dihydroxy-phenyl)propane and polyglycidyl ethers of novolacs are particularly preferred.

Compounds c4) which may be considered are those having groups reactive with 1,2-epoxides, thus predominantly compounds with carboxylic acid and amino groups, less preferably with thiol and hydroxyl groups. Hydroxy groups may, however, be converted into carboxylic acid groups in the stated manner.

The compounds of component c4) preferably have at least a primary amino group, a secondary amino group, a hydroxyl group or a carboxylic acid group. These components may additionally contain anionic groups, such as neutralized carboxylate, sulphonate or phosphonate groups or cationic groups, such as for example ammonium groups, which may improve the solubility, emulsifiability or dispersibility in water of the resins according to the invention. Suitable compounds are, for example, hydroxymethyl-3-hydroxy-sulphonic acid, dimethylolpropionic acid, tartaric acid, glycine, taurine, methyltaurine and aminoethylaminoethylsulphonic acid neutralized with alkali or organic bases, or amines such as N,N-dimethyl-N-(3-aminopropyl)-amine and bis-(N,N-dimethylaminopropyl)amine.

Further suitable component c4) compounds are, for example, dicarboxylic acids such as succinic acid, adipic acid, suberic acid, azelaic acid, sebacic acid, phthalic acid, tetrahydrophthalic acid or hexahydrophthalic acid, fatty acids such as coconut fatty acid, lauric acid, myristic acid, palmitic acid, stearic acid, oleic acid, linoleic acid, tall oil fatty acids, dimeric or trimeric fatty acids and fatty amines such as dodecylamine, tetradecylamine, hexadecylamine, octadecylamine and N-methyloctadecylamine.

Preferred compounds are those compounds soluble, emulsifiable or dispersible in water and containing perfluoroalkyl groups which contain 5 to 95 wt. % of oxyethylene units, calculated at an oxyethylene unit equivalent weight of 44 g/mol, 1.5 to 60 wt. % of fluorine and optionally up to 200 milliequivalents of ionic groups per gram of compound. Compounds soluble, emulsifiable or dispersible in water and containing perfluoroalkyl groups prepared from sulphonamides of general formula (II) having perfluoroalkyl groups, polyoxyalkylene-modified polyesters containing acid groups and compounds which contain 1,2-epoxide groups are particularly preferred.

Further constituents d) in the preparations according to the invention which may preferably be considered are: auxiliaries which counteract coagulation of the particles present in the dispersion and which may in this manner increase the stability of the dispersion, substances which promote film formation, substances which promote adhesion to substrates of substances which promote the hydrophobic or oleophobic properties of the preparations according to the invention.

The auxiliaries which counteract coagulation of the polymer particles present in the dispersion and which may in this manner increase the stability of the dispersion are generally so-called external emulsifiers, i.e. anionic, cationic or neutral low molecular weight, oligomeric or polymeric emulsifiers, surfactants or protective colloids. These may be contained in a quantity of 0 to 30 wt. %, preferably of 0 to 10 wt. %, related to the mass of the solids in the preparations according to the invention.

Examples of anionic low molecular weight, oligomeric or polymeric emulsifiers or surfactants are alkali metal or alkaline earth metal salts of fatty acids, for example sodium salts of saturated fatty acids with 10 to 21 carbon atoms, sodium salts of unsaturated fatty acids with 12 to 18 carbon atoms, chlorosulphonated and saponified liquid paraffins, alkyl ether sulphonates such as ethers of $\alpha$-sulpho-$\omega$-hydroxypolyethylene glycols with, for example, 1-methylphenylethylphenol, nonylphenol, or alkyl ethers with 12 to 18 carbon atoms, arylalkylsulphonates, such as for example naphthalenesulphonic acids provided with straight-chain or branched butyl groups, or alkyl sulphates, such as the sodium salts of long-chain sulphuric acid alkyl esters.

Examples of cationic low molecular weight, oligomeric or polymeric emulsifiers or surfactants are the salts of amines with 8 to 22 carbon atoms bearing long-chain alkyl groups, which amines were reacted with acids or by alkylation to yield the ammonium compounds, together with analogous phosphorus and sulphur compounds.

Examples of non-ionic oligomeric or polymeric emulsifiers or surfactants are alkyl polyglycol ethers or esters, such as ethoxylated long-chain alcohols, with for example 12 to 18 carbon atoms, bearing saturated or unsaturated bonds, ethoxylated castor oil, ethoxylated (coconut) fatty acids, ethoxylated soy bean oil, ethoxylated resin or rosin acids, ethoxylated and optionally propoxylated diethylene glycol monobutyl ether or ethoxylated alkylaryl ethers such as ethoxylated straight-chain and/or branched nonylphenol or octylphenol or benzylated p-hydroxybiphenyl.

Suitable emulsifiers or surfactants also include ethoxylated long-chain alkyl- or alkenylamines, lecithin, compounds modified with long-chain alkyl isocyanates prepared from polyethylene glycols and diisocyanates, reaction products of rapeseed oil and diethanolamine or ethoxylated compounds prepared from sorbitan and long-chain alkane- or alkenecarboxylic acids.

Suitable protective colloids are, for example, polyvinyl alcohols or water-soluble cellulose derivatives such as methyl cellulose.

Film-forming substances are generally polymeric compounds which have a sufficient molecular weight to promote film formation, thus in general a molecular weight of over 10000. They may be contained in the preparations according to the invention in a quantity of 0 to 50 wt. % related to the mass of the solids in the preparations according to the invention. These are preferably polyurethanes, (optionally epoxy-functional) polyesters, polyethers, polyvinyl esters, polyvinyl alcohols, polyacrylates, polyolefins or polymers which are themselves industrially customary and known to the person skilled in the art. The film-forming substances are present in a form emulsified, dispersed or dissolved in water or may simply, i.e. for example by simply having water stirred in or being stirred into water, be converted into a form emulsified, dispersed or dissolved in water. Further film-forming substances are, for example, orthosilicates, which crosslink on drying of the preparations according to the invention.

Substances which promote adhesion to substrates in constituent d) are preferably compounds of the general formula (IV)

wherein

X, Y and Z have the same meaning as in formulae (I) and (III) and $R^2$ means a monovalent alkyl, cycloalkyl, alkylaryl or aryl group with 1 to 20 carbon atoms, optionally substituted with functional groups.

Functional alkoxysilanes are particularly preferred, for example alkoxysilanes having vinyl, (meth)acrylic, 1,2-epoxy, thiol, amino, urea or azide groups, such as vinyltrimethoxysilane, vinyltriethoxysilane, vinyltris(2-methoxy-ethoxysilane), 3-methacryloxypropyltrimethoxysilane, β-(3,4-epoxycyclohexyl)ethyltrimethoxysilane, γ-glycidoxypropyltrimethoxysilane, γ-glycidoxypropyl-tris(2-methoxyethoxysilane), γ-mercaptopropyltrimethoxysilane, 3-aminopropyltriethoxysilane, 3-aminopropyl-trimethoxysilane, N-2-(aminoethyl)-3-aminopropyltrimethoxy-silane, N-2-(aminoethyl-N'-2'-aminoethyl)-3-aminopropyl-trimethoxysilane, N,N-di-(3-propyltrimethoxysilyl)-amine, 3-ureidopropyltriethoxysilane, cyclopentadienylpropyl-triethoxysilane and 3-azidopropyltriethoxysilane.

Substances which promote the hydrophobic or oleophobic properties of the preparations according to the invention are, for example, fats, waxes or oils based on natural or mineral fats or alkylalkoxysilanes, such as methyl-trimethoxysilane, octyltrimethoxysilane, methyloctyl-trimethoxysilane, hexadecyltrimethoxysilane, octadecyl-trimethoxysilane and methyloctadecyldimethoxysilane. The silicone resins described in EP-A 130 521 and EP-A 157 323 are also suitable.

The preparations according to the invention may also contain substances which adjust the pH value of the aqueous dispersions, solutions or emulsions to a certain value, for example organic or inorganic acids such as acetic acid, lactic acid, citric acid or tartaric acid, bases such as ammonia, amines or alkanolamines, alkali metal hydroxides, alkali metal hydrogen carbonates or alkali metal carbonates and salts, such as sodium acetate, sodium hydrogen phosphate or sodium phosphate. In the presence of water, the preparations according to the invention preferably have a pH of 3 to 9, particularly preferably of 5 to 8.

The preparations according to the invention may contain as further constituents d) compounds prepared from i) one or more sulphonamides of the general formula (II) having perfluoroalkyl groups

wherein $R^{f1}$ has the same meaning as $R^f$ in formula (I), but independently thereof, —$R^1$ means hydrogen or a monovalent hydrocarbon chain with 1 to 20 carbon atoms, optionally interrupted by 1 to 4 oxygen atoms, ii) at least one compound with 1,2-epoxide groups and iii) optionally further compounds containing groups reactive with 1,2-epoxide groups.

The starting compounds for these compounds are those used for the compounds c).

The preparations according to the invention may be produced by the individual constituents of the preparations being separately produced and together or optionally in stages dissolved, emulsified or dispersed in water. The process may be performed without solvents or with slight addition of solvent. The solvents may subsequently remain in the preparation or alternatively be removed by suitable processes, for example by distillation. Suitable solvents are inert solvents such as dimethylformamide, N-methylpyrrolidone, dimethylacetamide, acetone, 2-butanone, tetrahydrofuran, methyl tert.-butyl ether, toluene, chloroform or dichloromethane.

In a particular variant, the alkoxysilane compounds containing perfluoroalkyl groups in constituent b), the compounds soluble in water or emulsifiable or dispersible in water and containing perfluoroalkyl groups in constituent c) and the compounds bearing perfluoroalkyl groups optionally contained in constituent d) are produced together and together dissolved, dispersed or emulsified in water.

The preparations according to the invention may be used as agents to treat, protect and impregnate glass, stony materials, such as masonry, concrete, calcareous sandstone, plaster, mortar, marble, ceramics, bricks and natural stone, for example as a hydrophobizing or oleophobizing agent, for cleaning or as an anti-graffiti finish, as an agent for treating textiles, leather and paper, for example for providing a rain repellent finish or soil repellent finish on clothing, table linen and awnings, to protect and provide a dirt repellent finish for rugs, fitted carpets and textile floor coverings and to finish and protect leather articles such as shoes, gloves and leather clothing.

The following practical examples are intended to illustrate the present invention in greater detail.

EXAMPLES

Pre-adduct 1:

200 g of a polyethylene glycol with an average molecular weight of 2000 g/mol and 20 g of succinic anhydride are stirred at a temperature of 150° C. in a three-necked flask with a mechanical stirrer and internal thermometer until the reaction product has an acid value of 51 mg KOH/g.

EXAMPLE 1

Production of a Preparation According to the Invention by Mixing the Various Constituents and Dispersing Them Together 55 g of pre-adduct 1, 40 g of bisphenol A bisglycidyl ether with an epoxide equivalent weight of 200 g/tool of epoxide and 0.5 g of sodium carbonate are stirred at 100° C. in a three-necked flask with a mechanical stirrer and internal thermometer until an acid value is no longer detectable. 76.95 g of perfluorooctylsulphonic acid N-methylamide are added and the mixture stirred for 24 hours at 100° C.

The resin is dissolved in 500 ml of acetone mixed with 78.05 g of 3-(N-methyl-N-perfluorooctylsulphonamido)-2-hydroxypropylpropyltris(methoxyethoxy)silane. Dispersion is achieved by adding a mixture of 870 ml of water and 0.31 g of acetic acid and the acetone is distilled off at approximately 35° C. down to a pressure of 16 mbar. A finely divided dispersion is obtained with a pH of 5.0, a viscosity of 90 mPa.s and a stability of >3 months.

EXAMPLE 2

Production of a Preparation According to the Invention by Producing the Various Constituents Together and Dispersing Them Together 22 g of pre-adduct 1, 12 g of bisphenol A bisglycidyl ether with an epoxide equivalent weight of 200 g/mol of epoxide and 0.2 g of sodium carbonate are stirred at 100° C. in a three-necked flask with a mechanical stirrer and internal thermometer until an acid value is no longer detectable. 37.65 g of perfluorooctylsulphonic acid N-methylamide and 7.84 g of γ-glycidoxypropyltrimethoxysilane are then added and stirring is continued for 24 hours at 100° C. 45.4 g of octyltrimethoxysilane are then added and stirring continued for 10 minutes. The mixture is dissolved in 250 ml of acetone, dispersion achieved by adding a mixture of 187.5 ml of water and 0.2 g of acetic acid and the acetone is distilled off at approximately 35° C. down to a pressure of 16 mbar. A finely divided dispersion is obtained with a pH of 6.5, a viscosity of 80 mPa.s and a stability of >3 months.

EXAMPLE 3

Use 20 g of each of the dispersions from Examples 1 and 2 are diluted with 480 g of water. Pieces of cotton fabric are impregnated with the diluted dispersion and then dried at 25° C. and for 1 hour at 110° C. in a drying cabinet. Drops of water and liquid paraffin are then placed upon the woven fabric. The time taken for the drops to penetrate into the woven fabric is measured

| Impregnation with dispersion from | Time to wetting of woven fabric | |
|---|---|---|
| | water | paraffin |
| Example 1 | 5 hours | >3 days |
| Example 2 | 2 hours | >3 days |
| Not impregnated | <1 minute | <1 minute |

EXAMPLE 4

Use 20 g of each of the dispersions from Examples 1 and 2 are diluted with 480 g of water. Pieces of unglazed ceramic are immersed for 30 seconds in the diluted dispersions and then dried for 24 hours at 25° C. and for 5 hours at 110° C. One drop each of water and liquid paraffin are then placed on the ceramic article. The time taken for the drops to penetrate into the ceramic is measured.

| Impregnation with dispersion from | Depth of penetration | Time to wetting of ceramic | |
|---|---|---|---|
| | | water | paraffin |
| Example 1 | approx. 0.5 mm | 4.5 hours | >3 days |
| Example 2 | approx. 1 mm | 6.0 hours | >3 days |
| Not impregnated | — | <1 minute | <1 minute |

It will be understood that the specification and examples are illustrative but not limitative of the present invention and that other embodiments within the spirit and scope of the invention will suggest themselves to those skilled in the art.

We claim:

1. A self-crosslinking composition comprising

α) water

β) at least one alkoxysilane compound containing at least one perfluoroalkyl group, of the formula $$R_f{-}(A{-})_b{-}\underset{Z}{\overset{X}{\underset{|}{\overset{|}{Si}}}}{-}Y \qquad (I)$$

wherein $R^f$ is a monovalent perfluoroalkyl group with 4 to 20 carbon atoms,

A is an (a+1)-valent aliphatic, cycloaliphatic, aromatic or heterocyclic group or a radical containing several members selected from the group consisting of aliphatic, cycloaliphatic, aromatic and heterocyclic groups, with 1 to 20 carbon atoms, which radical optionally contains 1 to 10 oxygen, nitrogen or sulphur atoms, b is 1 or 0, a is a number from 1 to 4 if b=1, and 1 if b=0, X, Y and Z are identical or different monovalent alkoxy groups with 1 to 6 carbon atoms optionally interrupted by one or two oxygen atoms, cycloalkoxy groups with 6 to 10 carbon atoms, aryloxy groups with 6 to 10 carbon atoms, alkyl groups with 1 to 6 carbon atoms, cycloalkyl groups with 6 to 10 carbon atoms or aryl groups with 6 to 10 carbon atoms, providing that at least one of X, Y and Z denotes an alkoxy group, and γ) at least one compound soluble in water or emulsifiable or dispersible in water containing at least one perfluoroalkyl group, which compound is produced from γ1, γ2 and γ3, wherein, γ1 is at least one sulphonamide containing a perfluoroalkyl group, of the formula $$R^{f1}{-}SO_2{-}\underset{}{\overset{R^1}{\underset{|}{N}}}{-}H \qquad (II)$$

wherein $R^{f1}$ has the same meaning as $R^f$ in formula (I), but independently thereof, and $R^1$ is hydrogen or a monovalent hydrocarbon chain with 1 to 20 carbon atoms, optionally interrupted by 1 to 4 oxygen atoms, γ2 is at least one compound having at least one group reactive with 1,2-epoxide groups and having at least one oxyethylene unit, and γ3 is at least one compound which contains at least one 1,2-epoxide group, compound γ containing 5 to 95 wt. % of oxyethylene units.

2. A self-crosslinking composition according to claim 1, wherein constituent β contains at least one perfluoroalkylalkoxysilane of the formula

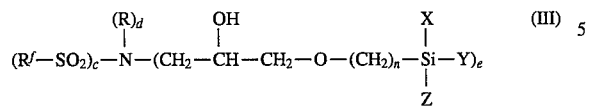

wherein
- R is hydrogen or a monovalent hydrocarbon chain with 1 to 20 carbon atoms, optionally interrupted by 1 to 4 oxygen atoms,
- c is 1 or 2,
- d is 0 to 1,
- e is 3−c−d, but at least 1 and
- n is an integer from 2 to 4.

3. A self-crosslinking composition according to claim 2, wherein
- R is a monovalent, aliphatic group with 1 to 4 carbon atoms,
- c is 1,
- d is 1,
- e is 1 and,
- n is 3.

4. A self-crosslinking composition according to claim 1 further comprising Δ at least one compound of the formula

wherein
- $R^2$ is a monovalent alkyl, cycloalkyl, alkylaryl or aryl group with 1 to 20 carbon atoms, optionally substituted with at least one functional group selected from the group consisting of vinyl, (meth)acrylic, 1,2-epoxy, thiol, amino, urea and azide.

5. A self-crosslinking composition according to claim 1, further containing (ε) produced from
  i) at least one sulphonamide containing at least one perfluoroalkyl group, of the formula

wherein
- $R^{f1}$ has the same meaning as $R^f$ in formula (I), but independently thereof, and
- $R^1$ is hydrogen or a monovalent hydrocarbon chain with 1 to 20 carbon atoms, optionally interrupted by 1 to 4 oxygen atoms, and
  ii) at least one compound which contains at least one 1,2-epoxide group.

6. A self-crosslinking composition according to claim 1, wherein compound γ2 of constituent γ comprises at least one polyester containing at least one acid group and having at least one oxyethylene unit.

7. A composition according to claim 1, containing the water in a quantity of 5 to 95% of the total weight of the composition.

8. A composition according to claim 1, containing the water in a quantity of 10 to 50% of the total weight of the composition.

9. A method for the treatment, protection or impregnation of glass, a stony material, textile, leather or paper which comprises applying thereto a composition according to claim 7.

* * * * *